United States Patent
Krauss et al.

(10) Patent No.: US 8,550,232 B2
(45) Date of Patent: Oct. 8, 2013

(54) LOG TRANSPORT SYSTEM

(75) Inventors: Jim Krauss, Hot Springs, AR (US); Josh Krauss, Spanish Fort, AL (US)

(73) Assignee: Price Logpro LLC, Malvern, AR (US)

( * ) Notice: Subject to any disclaimer, the term of this patent is extended or adjusted under 35 U.S.C. 154(b) by 188 days.

(21) Appl. No.: 12/702,397

(22) Filed: Feb. 9, 2010

(65) Prior Publication Data

US 2010/0200118 A1  Aug. 12, 2010

Related U.S. Application Data

(60) Provisional application No. 61/151,933, filed on Feb. 12, 2009.

(51) Int. Cl.
*B65G 19/30* (2006.01)
*B65G 19/22* (2006.01)
*B65G 19/00* (2006.01)

(52) U.S. Cl.
USPC ........ 198/717; 198/698; 198/823; 198/836.1; 198/836.4

(58) Field of Classification Search
None
See application file for complete search history.

(56) References Cited

U.S. PATENT DOCUMENTS

| | | | | | |
|---|---|---|---|---|---|
| 2,489,920 | A | * | 11/1949 | Michel | 324/243 |
| 4,231,464 | A | * | 11/1980 | Neilson | 198/456 |
| 5,422,467 | A | * | 6/1995 | Graef et al. | 235/379 |
| 6,539,830 | B1 | * | 4/2003 | Koskovich | 83/13 |
| 6,811,022 | B2 | * | 11/2004 | Seffens et al. | 198/698 |

* cited by examiner

*Primary Examiner* — Kavel Singh
(74) *Attorney, Agent, or Firm* — Jeffrey S. Melcher; Manelli Selter PLLC

(57) ABSTRACT

A system for lineally transporting logs, lugs therefore, and an associated method are provided. The system includes first and second tracks connected to a frame to provide continuous track surfaces. Lugs having support surfaces that correspond to the track surfaces are configured to be driven longitudinally along the tracks by a continuous conveyor belt.

26 Claims, 10 Drawing Sheets

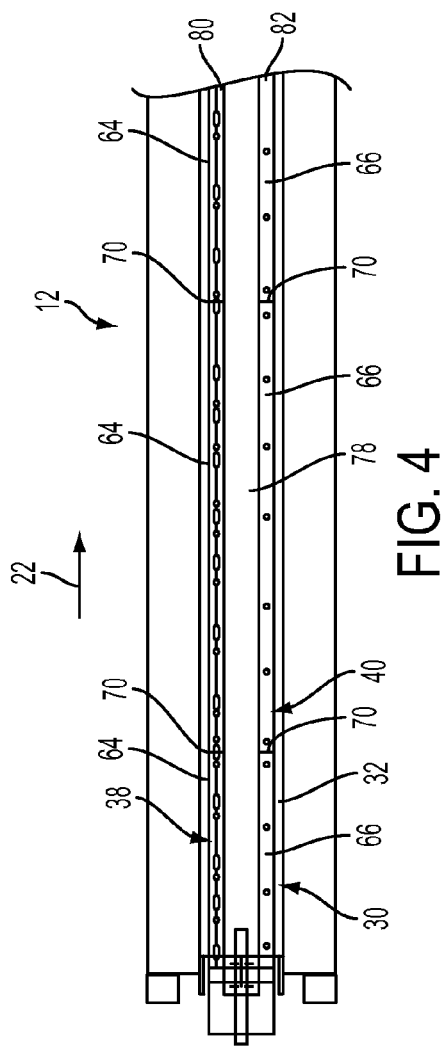
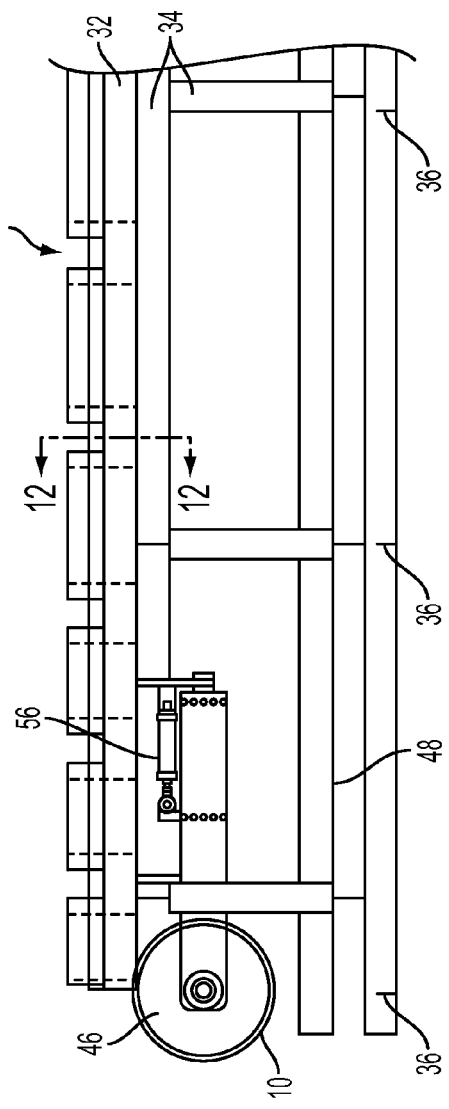

LOG TRANSPORT SYSTEM

This application claims priority to U.S. Provisional Patent Application Ser. No. 61/151,933, filed 12 Feb. 2009, the complete disclosure of which is incorporated herein by reference.

FIELD OF INVENTIONS

The present invention relates to log transport systems and, more particularly, relates to a system and method for transporting logs in a direction of motion while preventing appreciable unwanted motion, such as in directions transverse to the direction of motion, to thereby facilitate processing of the logs, such as by scanning, cutting, and the like.

DESCRIPTION OF RELATED ART

During the processing of tree logs, long sections of logs are often transported for a variety of processing steps. For example, according to one conventional process, tree length logs, or "stems," are transported lineally on a motor-driven chain or chain drive mechanism supported by tracks formed of track sections that are welded or bolted together. The logs are passed by or through a scanning device, such as an optical scanner, that detects the size and shape of the log. This information is sent to an optimizing device that determines how each log should be cut, or "bucked," to best yield useful lumber. The logs are then transported by the drive mechanism to a saw that cuts the logs accordingly, for example, by transporting the log against a mechanical stop that holds the log in place and moving the saw transversely to cut the log.

Each log is typically non-uniform along its length, i.e., the log varies in cross-sectional size or shape or defines curves or other non-uniformities. As a result, the chain and chain drive mechanisms may not support the logs evenly, and the logs may therefore move relative to the mechanism in a rocking, bouncing, or sliding motion. Additionally, conventional systems can introduce a certain amount of unwanted motion while transporting the logs, for example, if the track sections are not uniform or not aligned correctly or if the drive mechanism does not move at a uniform speed. The unwanted motion of the logs can adversely affect the accuracy of the scanning or other processing, resulting in sub-optimal processing of the logs.

One prior art method of transporting the logs while reducing unwanted motion is to support the logs on two parallel chains, which can be connected by cross members. The chains are then driven separately or together by motors to lineally transport the logs. This dual-chain system provides better support for the logs, but the chains typically wear and stretch at different rates. If the chains are driven by a single motor, the uneven stretching and wearing can increase the stress on the chains and cross members and decrease the performance of the system. If the chains are driven by separate drive mechanisms, the uneven wearing and stretching of the chains can result in different speeds of the chains, thus imparting additional, nonlinear motion to the logs, adversely affecting other processes such as scanning.

According to another prior art transporting system, the logs are supported by holders spaced incrementally along the length of a single chain. The holders and chain are supported by a track formed of welded or bolted track sections. Each holder defines a stepped slot parallel to the chain for receiving the log. Each stepped slot defines a pair of steps or terraces that extend upwardly in a divergent manner. Logs of different diameters can be received by the slot and supported by the steps. Undesirably, however, the holders may not prevent the logs from sliding in a direction parallel to the chain, for example, while the chain is being started or stopped. Also, even if the holders move at a constant speed, nonuniformities in the track can cause unwanted motion, as described above.

Flat conveyor belts have been used to transport logs. However, these belts have problems with difficulty in tracking the belts used for log transport, the logs move on the belts or the belts move under the log, and the entire circumference of the logs cannot be scanned.

U.S. Pat. No. 6,811,022 discloses a log transport system that utilizes a cumbersome chain link system. Chain link systems require lubrication, are heavy, noisy, prone to undesirable chordal action, and have a maximum safe speed of 400 feet per minute. While some advertised chain speeds are above 500 feet per minute, this speed is not practical, cannot be safely maintained using chains, and reduces the life of the chain.

Thus, there exists a need for a log transport system that supports the logs for lineal transport and substantially prevents rocking, bouncing, and sliding of the logs at safe speeds greater than 500 feet per minute, does not require lubrication, solves the problem of chordal action, and allows the entire circumference of the logs to be scanned.

BRIEF SUMMARY OF THE INVENTIONS

The present invention satisfies these and other needs by providing a log transport system, log-carrying lugs therefore, and an associated method of transporting logs. In accordance with one aspect of the present invention, the system includes tracks connected to a frame to provide substantially continuous and uniform track surfaces. Exemplary tracks connected to a frame and manufacture thereof are disclosed in U.S. Pat. No. 6,811,022, the complete disclosure of which is incorporated herein by reference. Lugs with support surfaces that correspond to the track surfaces are configured to support the logs as the lugs are slid longitudinally along the tracks. The lugs are driven by a conveyor belt and associated pulleys. Thus, the system transports the logs without substantial unwanted transverse motion.

According to an embodiment, the present invention provides a system for transporting a log, including first and second parallel tracks that extend longitudinally. Each of the tracks can be formed of track portions, or sections, arranged collinearly to define first and second track surfaces respectively. At least one of the tracks preferably has a nonlinear cross section. The tracks are supported by a frame so that the first track portions are substantially collinear and the first track surface is uniform and continuous in the longitudinal direction of the track to reduce transverse motion of the log during transport.

In accordance with another embodiment of the present invention, a plurality of lugs are adapted for supporting the log, each lug extending between the first and second tracks and defining first and second support surfaces that correspond in shape to the first and second track surfaces. For example, the support surfaces correspond to the respective track surfaces so that the lugs slide longitudinally along the tracks. The lugs are connected by a conveyor belt and configured to be slid along the tracks by a drive device, thereby transporting the log. Replaceable wear strips formed of a low friction material can be disposed between the support surfaces and the track surfaces. The system can also include a scanning device for determining dimensions of the log and a cutting device for transversely cutting the log.

In accordance with one aspect, the present invention also provides a lug for transporting a log. The lug includes opposite first and second portions defining first and second lower surfaces, respectively, for engaging first and second tracks. The first and second portions also define upper first and second edges opposite the first and second surfaces, which are configured to engage the log (or which may be equipped with spikes for engaging the log). Examples of suitable first and second edges are disclosed in U.S. Pat. No. 6,811,022. A connection portion extends between the first and second portions and is configured for connecting to a conveyor belt. Preferably, the first and second portions and connection portion are integrally formed. In another embodiment, the lugs are integrally formed with the conveyor belt. The first and second edges preferably define an angled space therebetween for receiving the log.

The conveyor belt is usually driven by a drive pulley and has an idler pulley at the opposing end. In an embodiment, at least one or both of the drive pulley and the idler pulley have an associated encoder(s) to sense belt slippage.

According to another embodiment of the invention, the lower first and/or second surfaces of the lugs define a contour, such as a ridge or groove, that corresponds to a track contour extending along the respective track so that the respective lower surface of the lugs can be engaged to the respective track to substantially prevent the lug from being pivoted or translated transversely. For example, one of the surfaces of the lug can define a v-shaped slot that receives/mates with a v-shaped contour of the respective track. The mating surfaces can be at least partially defined by a wear strip that is removable and replaceable. Alternatively, the mating surfaces can be formed from a low-friction wear pads, such as nylon, and attached to the lugs.

BRIEF DESCRIPTION OF THE DRAWINGS

FIG. 4 a partial plan view of the transport system of FIG. 1;

FIG. 5 is a partial elevation view of the transport system of FIG. 1;

DETAILED DESCRIPTION OF THE INVENTIONS

The present inventions now will be described more fully hereinafter with reference to the accompanying non-limiting drawings. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
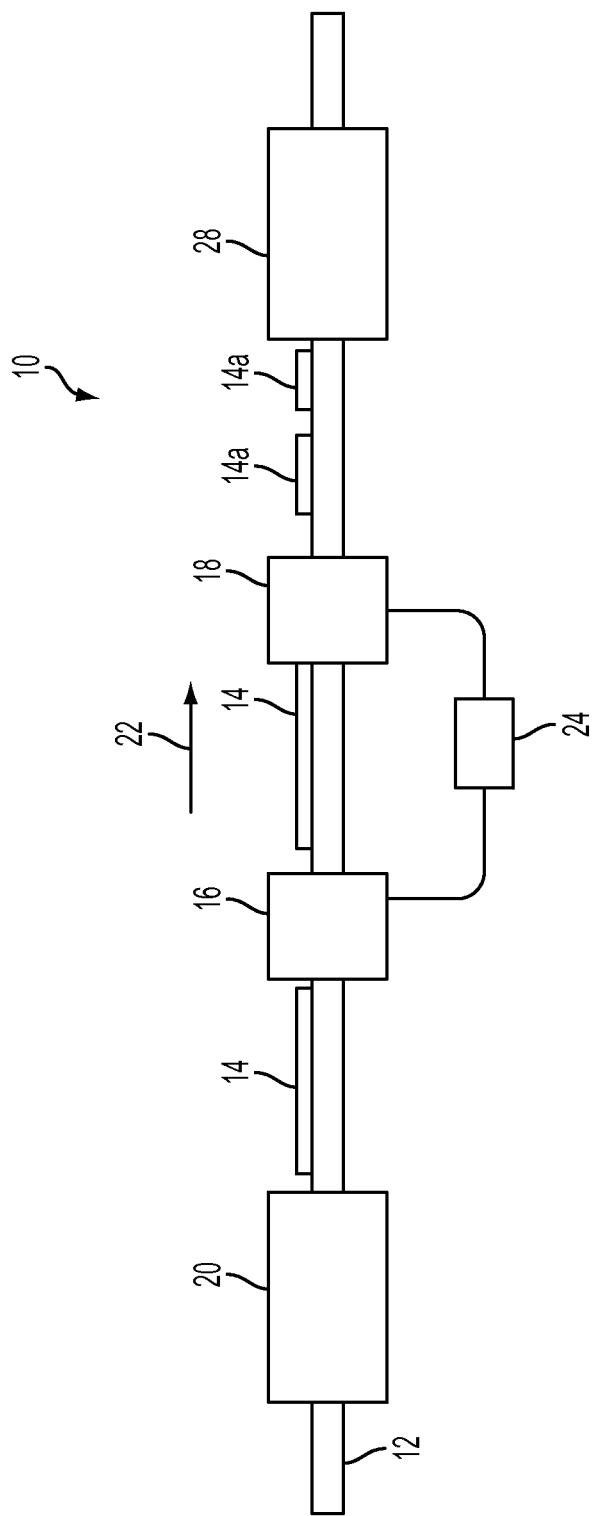
FIG. 1 is a side view of a log transport system according to one embodiment of the present invention.

Referring now to the figures and, in particular, to FIG. 1, there is illustrated a log transport system 10 according to one embodiment of the present invention. The log transport 10 system includes a conveyor 12 for transporting the logs 14 through or past one or more processing devices, such as a computerized scanning device 16 and/or a cutting device 18. For example, logs can be loaded endo from a preceding conveyor or from the side using loading device 20 can first load the logs 14 onto the conveyor 12. The loader 20 can load the logs 14 individually in a transverse direction from a table (not shown) to the conveyor 12. The conveyor 12 typically transports the logs 14 in a longitudinal direction, indicated generally by reference numeral 22. As each log 14 passes through the scanning device 16, the scanning device 16 detects physical characteristics of the log 14 such as the length and profile. For example, the scanning device 16 can be an optical scanner, such as a laser scanner, that detects the cross-sectional size and shape of each log 14 along its length, thereby detecting any curves, voids, or other non-uniformities in the log 14. The scanning device 16 preferably generates scan data for each log 14, and the scan data is communicated to a processing device 24, which can determine an optimal manner of cutting the log 14 to generate any desired products, for example but not limited to, lumber, chips, biomass, flakes, etc. The processing device 24 can determine the optimal manner of cutting the log 14 based on such factors as the size and shape of the log, non-uniformities in the log 14, current pricing information for the possible products to be generated from the log 14, and the like as is known in the art. The conveyor 12 transports the log 14 longitudinally through the cutting device 18, where the log 14 is cut transversely according to the optimal manner determined by the processing device 24. The cut pieces 14a derived from the log 14 can be unloaded from the conveyor 12 by an unloader 28. Although the logs 14 are transported longitudinally along a single direction of motion through the system illustrated in FIG. 1, the logs 14 can alternatively be transported by multiple transport systems, some of which may transport the logs 14 in different directions. While cutting and scanning on the same conveyor 12 have been described, the invention also covers cutting and scanning on separate conveyors as desired.

The scanning device 16 can also include metal detection capabilities for determining metal in the log 14. When metal detection is desired, non-magnetic fasteners are preferably used on the conveyor 12 and the tracks 38 and 40 in the location of the scanning device 16 is also preferably non-magnetic. A scanning device 16 including metal detection capabilities cannot be used on conventional chain link conveyors.

Figure 2:
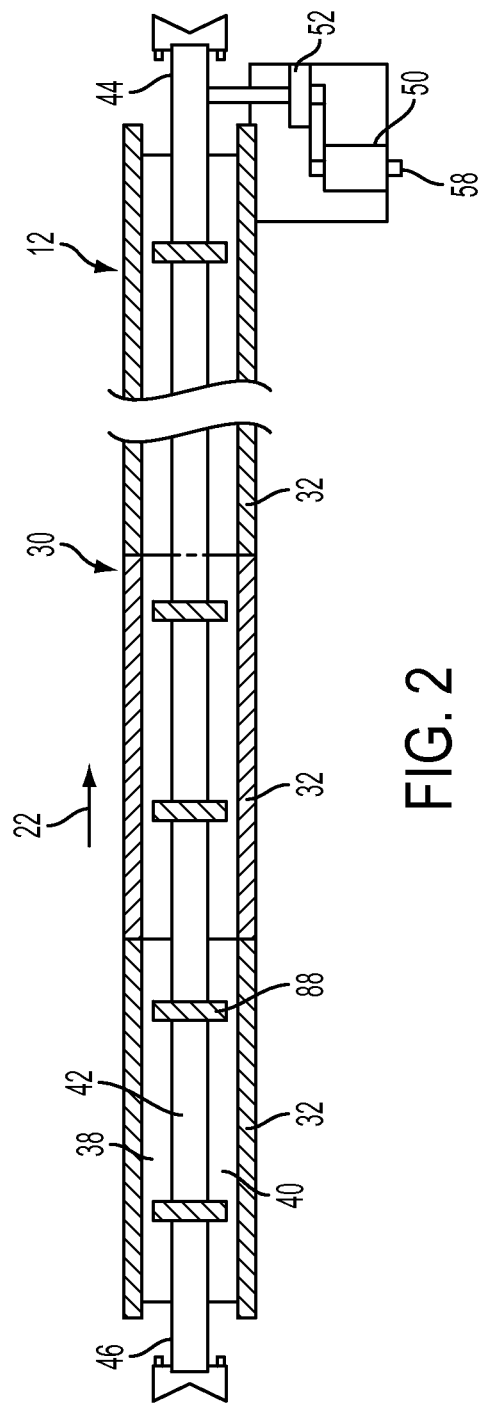
FIG. 2 is a fragmentary top plan view of the transport system of FIG. 1.
Figure 3:
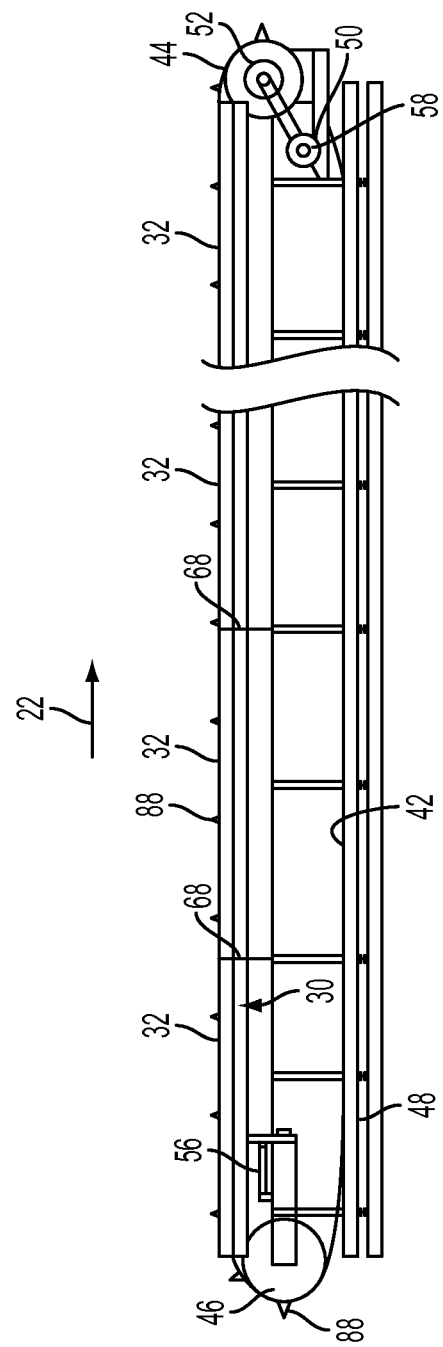
FIG. 3 is a fragmentary elevation view of the transport system corresponding to FIG. 2.

As shown in FIGS. 2-5, the conveyor 12 includes a frame 30, which is formed of a plurality of frame portions 32 that are supported by a support assembly 34. The support assembly 34 can be an assembly or framework of structural members, such as steel beams or other structural beams, on which the frame 30 is supported. The support assembly 34 can include one or more jacking bolts 36 for adjusting the assembly 34 to provide a continuous and straight structure for supporting the frame 30. The frame 30 preferably supports first and second tracks 38, 40 that extend longitudinally along the conveyor 12. The tracks 38, 40 preferably are parallel and define a space therebetween for a drive member. For example, the drive member can be an endless or continuous conveyor belt 42 extending between pulleys 44, 46 configured at opposed ends of the conveyor 12. In FIG. 3, the portion of the belt 42 disposed above the frame 30, i.e., the upper run in FIG. 3, is driven in the direction 22 of motion of the logs 14. The portion of the belt 42 disposed below the frame 30, i.e., the return portion of the belt 42 or the lower run in FIG. 3, travels in the opposite direction. The return portion of the belt 42 can be supported by a belt 42 or log-carrying lug 88 return race 48, which can be shaped to support the belt 42 or log-carrying lug 88.

At least one of the pulleys 44, 46 is configured to be driven, for example, by an electric motor 50 or other driving device, which can be connected to the pulley 44, 46 through a gearing device such as a reduction gearbox 52. In the figures, the drive pulley is shown at 44. The motor 50 and gearbox 52 can be configured to safely move the belt 42, and hence the logs 14, at speeds as high as 500 to 1000 feet per minute, preferably 700 to 800 feet per minute. Preferably, at least one of the pulleys 44, 46 is biased outward by a tension device 56 to apply tension to the belt 42. The tension device 56 can be a hydraulic cylinder or other device that is connected to a pressure source with a pressure sensing device to feed a signal back to the computer. Therefore, if the encoder senses belt slippage, the computer can add pressure to the take-up thus allowing the belt to run with the minimum tension allowing increased belt life.

A rotational encoders or feedback devices can be configured to detect the speed of any of the motor 50, pulleys 44, 46, or other system components and thereby calculate the speed of the belt 42, pulleys 44, 46, and the logs 14. Preferably, at least one of the pulleys 44 and 46, more preferably both pulleys 44 and 46, are configured with an encoder. The encoder 58 is associated with the drive pulley 44. Used in conjunction with the scanning device 16 or another detector, such as a photocell, for detecting the ends of the logs 14 during transport, the rotational encoder 58 can also be used to determine the length of the logs 14 and the position of the logs 14 on the belt 42 during processing, for example, to accurately position the logs 14 during cutting. Furthermore, by comparing the speed of the belt 42 determined by encoder 58 with the speed of the logs 14 determined by the scanning device 16, or rotational rpm/speed differences of pulleys 44 and 46, any belt slippage can be determined.

The conveyor 12 can be used to transport the logs 14 and position the logs 14 throughout the system 10. For example, the logs 14 can be positioned and stopped proximate to the cutting device 18 so that the cutting device 18 can process any required cut solution like removing a small portion of the end of the log 14, sometimes referred to as a "lily pad," and the cutting device 18 can be used to cut the logs 14 accurately into the shorter pieces 14a uniformly or according to instructions from the processing device 24.

Mechanical slack can be reduced by eliminating slippage between the motor 50 and the belt 42 by connecting the motor 50, the gearbox 52, and the pulleys 44, 46 with timing belts, belts, or shafts. For example, the motor 50 and the gearbox 52 can be connected by a timing belt 60, and a shaft connection can be provided between the gearbox 52 and the pulleys 44. Shaft mounted components, such as the pulleys 44, 46, can be mounted using keyless hubs, which prevent looseness or play in the connection therebetween. Further, torque arms (not shown), used to connect the gearbox 52 to the support assembly 34 or the motor 50, can be provided with a stiff damper that prevents substantial movement of the gearbox 52.

The present invention can be used to minimize rocking, bouncing, or sliding of the logs during transport. Further, the logs can be accurately positioned longitudinally such that lily pads as thin as 0.125 inch can be cut from the logs and the logs can otherwise be cut at accuracies of 0.125 inch or less, reducing wasted material and accurately cutting the logs 14 into the pieces 14a according to the predetermined optimal manner.

Although the frame portions 32 can be provided in any length, long conveyors 12 are preferably built by assembling a plurality of shorter frame portions 32 as shown in FIGS. 2 and 3. For example, the frame portions 32 preferably are manufactured in lengths of about 20 feet, and conveyors 12 longer than 20 feet can be built by assembling two or more frame portions 32 in an end-to-end series. Similarly, each of the tracks 38, 40 preferably are formed of shorter track portions 64, 66 that are collinearly configured and supported by the frame 30. That is, the track portions 64, 66 are arranged end-to-end in series. Preferably, the track portions 64, 66 are arranged in a staggered configuration relative to the frame portions 32 so that the track portions 64, 66 overlap interfaces 68 between abutting or adjacent frame portions 32, i.e., the interfaces 68 between the frame portions 32 are disposed at longitudinally offset positions and are not coincident with interfaces 70 between adjacent track portions 64, 66. For example, if frame portions 32 that are 20 feet in length are used to form the frame 30, track portions 32 in 5 feet lengths can be provided at the ends of the conveyor 12 and 10 feet lengths therebetween, as shown in FIGS. 2 and 4.

Figure 6:
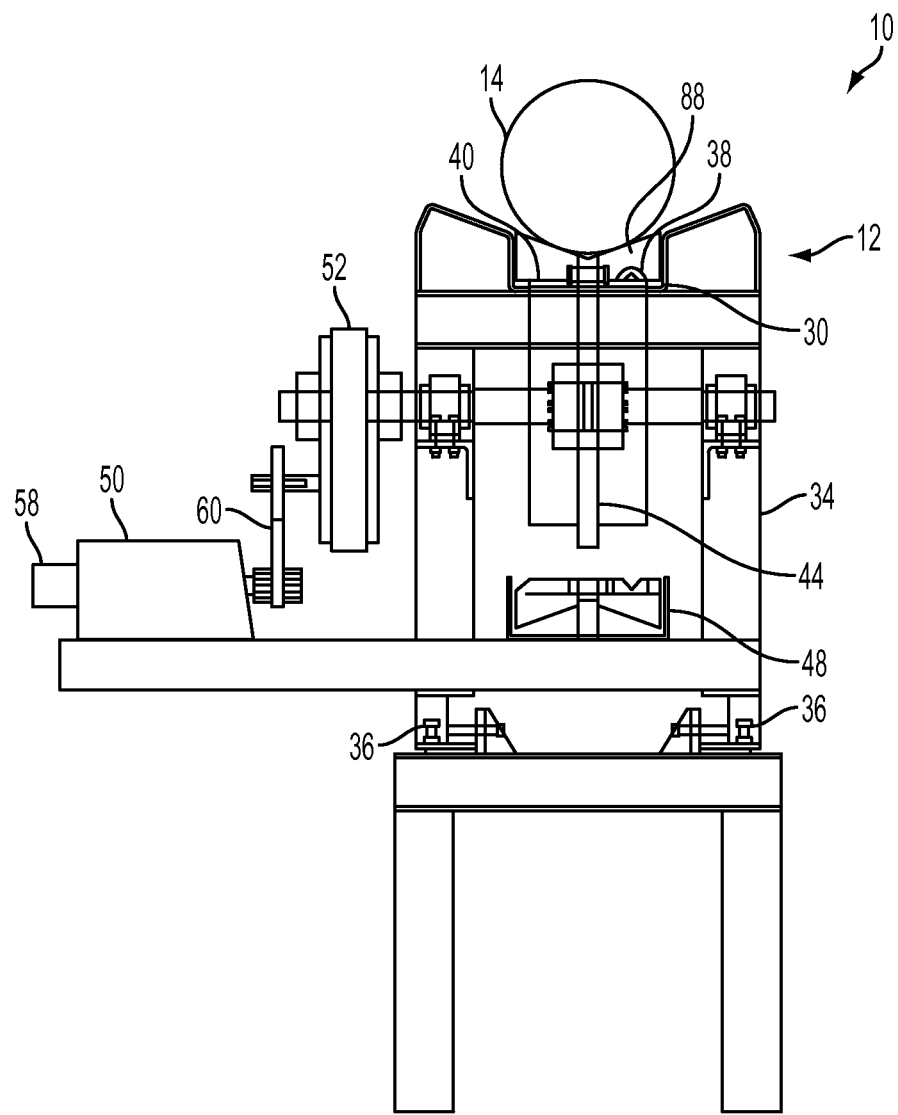
FIG. 6 is an end view of the transport system of FIG. 1, shown in elevation as seen from the right side of FIG. 3.
Figure 7:
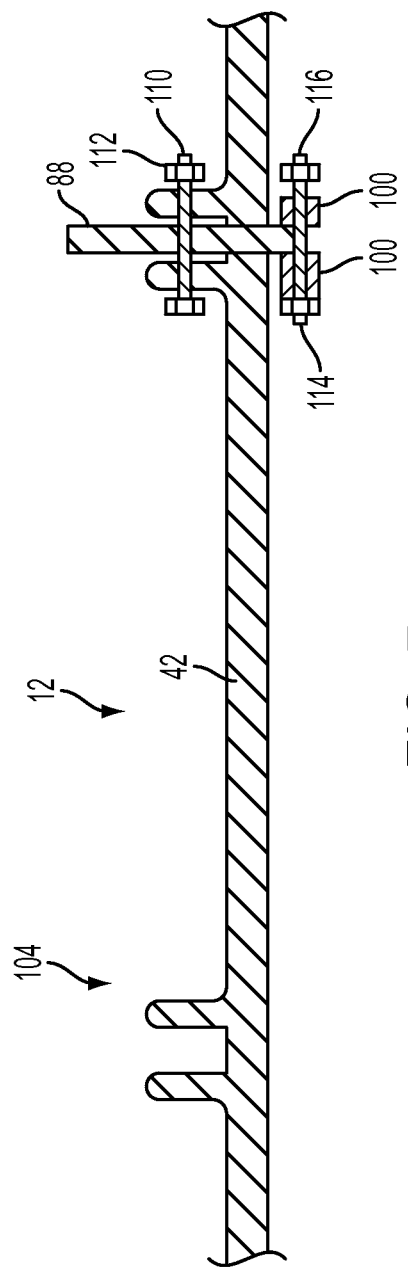
FIG. 7 is side view of a conveyor belt having a lug mounted thereon.
Figure 8:
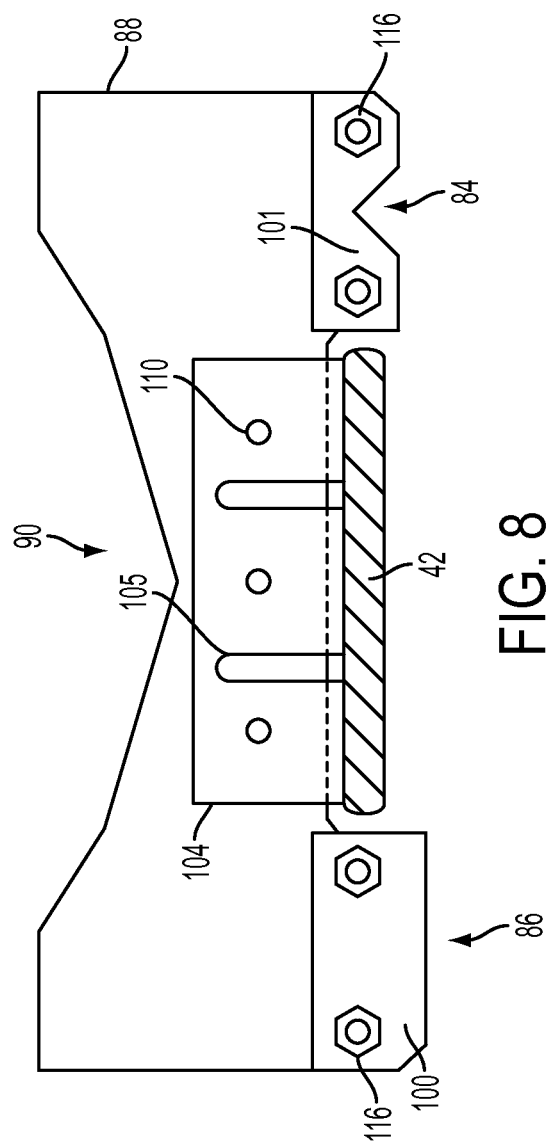
FIG. 8 is section view of a lug mounted on a conveyor belt.
Figure 9:
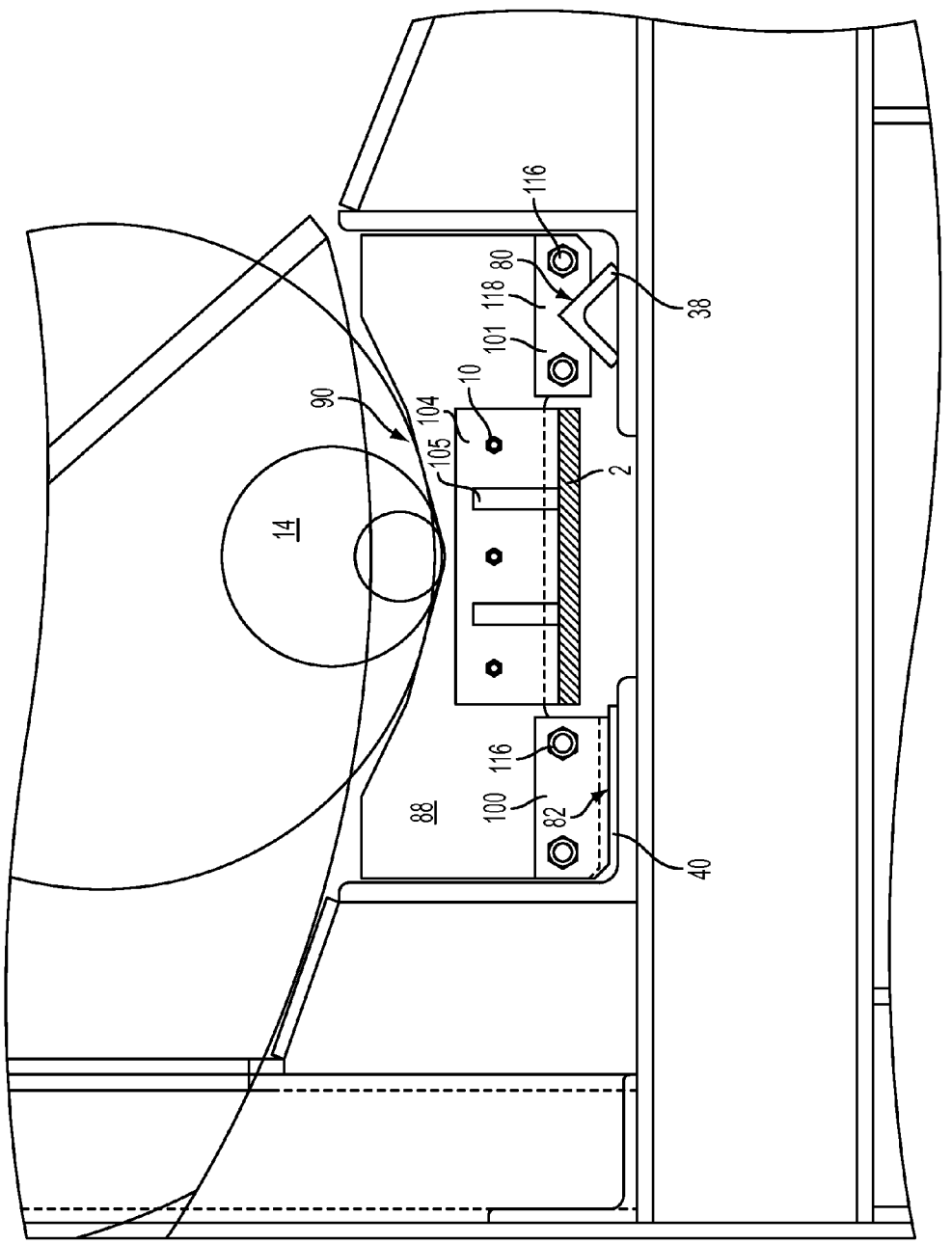
FIG. 9 is a section view of a transport system.

The first and second track surfaces 80, 82, which are parallel and extend longitudinally, are configured to correspond to first and second support surfaces 84, 86, respectively, of log-carrying lugs 88 that slide thereon. According to an embodiment of the present invention, the first track surface 80 defines a nonlinear cross section that is uniform in the longitudinal direction 22 of the tracks 38, 40, and the second track surface 82 defines a linear cross section that is also uniform in the longitudinal direction 22. For example, each first track portion 66 can define a ridge that extends from a base of the portion 66, so that the first track surface 80 defines a contour, such as a v-shaped contour, and the second track surface 82 can define a flat surface which extends perpendicular to the longitudinal direction 22, as shown in FIGS. 6, 8 and 9. Thus, each lug 88 can slide longitudinally along the track surfaces 80, 82, and the first track surface 80 keeps the lugs 88 aligned with the tracks 38, 40.

Figure 10:
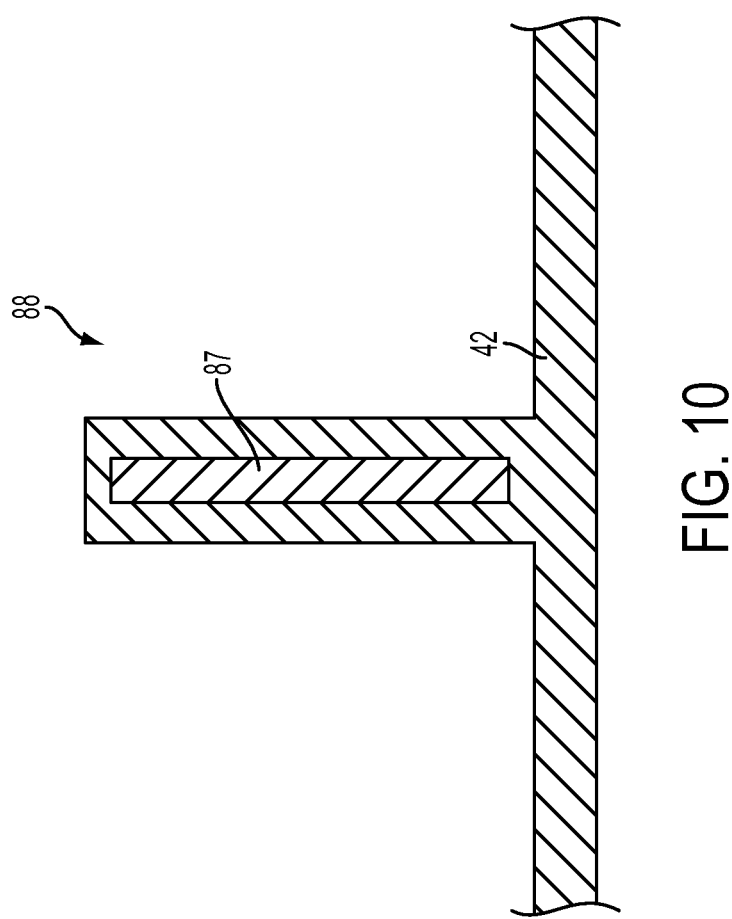
FIG. 10 is a cut away side view of an integrally formed lug and belt.

The lugs 88 can be formed of any material having sufficient strength to support typical logs 14. A typical log 14 weighs about 7,000 to 8,000 pounds, has a diameter of about 18 inches, and is about 50 feet long. However, logs having a diameter of from 2 to 24 inches can be processed. Examples of suitable materials include metals, plastics, composites, and reinforced rubber. Preferably, the lugs are formed of plastic, such as polyester. As shown in FIG. 10, if the lugs 88 are integrally formed with the belt 42, the lugs 88 can reinforced 87 with any desired material, such as metals, plastics, and composites.

A typical distance between lugs 88 is from 1 to 8 feet. The lug distance can depend on the desired length of the cut logs and the degree of stabilization required for scanning. For example, if the desired minimum length of the log 14 is 6 feet, the distance between the lugs 88 should be less than 6 feet. If the desired stabilization is high the lugs 88 can be located on 1 feet centers. In general, the greater the distance between the lugs 88, the stronger the lugs 88 must be. The closer the distance between the lugs 88 the greater the stability of the log 14 being transported. With removable lugs 88, the user can decide how many and the distance between the lugs 88 by leaving some of the cleats 104 empty depending on configuration.

The thickness of the lugs 88 will depend upon the material selected. For polyester lugs 88, suitable thickness have been found to be about 0.25 inches to 1.5 inch. Plastic is a preferred material since it is lightweight, strong, and is corrosion resistant. In general, the lighter the weight of the belt 42 and lugs 88, the faster the belt 42 can be safely run and the less wear on the moving parts.

The lugs 88 are attached to the belt 42 in any desired manner. For example, as shown in FIGS. 8 and 9, the belt 42 has molded cleats 104, between which the lug 88 is fastened by bolts 110 and nuts 112. For added strength, the cleats 104 have ribs 105. The cleats 104 are constructed and arranged to firmly anchor the lugs 88 to the belt 42. Examples of suitable heights for the cleats are from 0.25 inch to 6 inch and examples of suitable thickness are from 0.25 inch to 4 inch. In another embodiment, the lugs 88 are integrally formed on the belt 42 as shown in FIG. 10.

The first and second support surfaces 84, 86 of the lugs 88 in the upper run of the belt 42 engage the first and second track surfaces 80, 82. The belt 42 is disposed between the tracks 38, 40 and preferably does not contact the frame 30 or the tracks 38, 40. For example, the first support surface 84, defined by the base of each lug 88, can define a downwardly-open groove, such as a v-shaped slot, that extends in the longitudinal direction 22 and corresponds in shape to the first track surface 80. The second support surface 86 can define a flat surface to slide smoothly on the second track surface 82, and the links 54 can be disposed therebetween.

The lugs 88 define a log-receiving space 90 configured to receive and support the logs 14 and transport the logs 14 in the longitudinal direction 22. The lugs 88 should support the logs 14 above the belt 42 a sufficient distance to allow the scanning device 16 to scan the entire circumference of the logs 14. Preferably, the lugs 88 are sized to support the logs 14 from 0.1 inch to 6 inches above the belt 42, more preferably from 2 to 4 inches above the belt 42.

Figure 11:
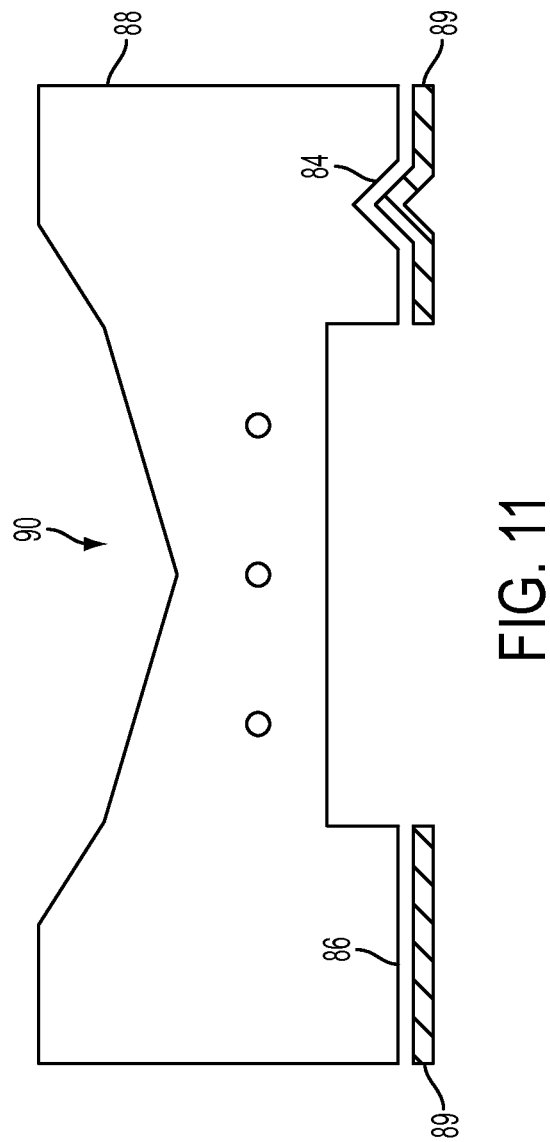
FIG. 11 is a section view of a lug having replaceable wear strips.

The track surfaces 80, 82 can be formed of a strong material that is corrosion and wear resistant such as stainless steel or wear resistant type polymer. Additionally, as shown in FIG. 11 wear strips 89 can be disposed between the track surfaces 80, 82 and the support surfaces 84, 86 of the lugs 88. For example, the wear strips can be attached to the support surfaces 84, 86 by adhesives, fasteners such as rivets, bolts, or clips, and the like. According to one embodiment, the track surfaces 80, 82 are formed of stainless steel, which resists corrosion and the wear strips 89 are formed of a low friction polymer, such as Nylatron®, a registered trademark of Polymer Corporation of Reading, Pa., or other low-friction materials. A replaceable, low friction material can also be provided on the track surfaces 80, 82.

In place of using wear strips 89, the lugs 88 are preferably provided with replaceable wear pads 100 and 101. The wear pads 100 and 101 can be formed of any low friction and/or self lubricating material, such as nylon. The use of wear pads 100 and 101 greatly extends the life of the lugs 88 since instead of having to replace the entire lug 88 when worn, only the wear pads 100 and 101 need be replaced. The wear pads 100 and 101 can be fastened to the lugs 88 in any desired manner, such as by the fasteners 116. If desired, the entire lug 88 can be formed from a low friction polymer, which negates the need for wear strips 89 or wear pads 100 and 101.

The belt 42 can be formed of any suitable materials used for making belts. The belt 42 is preferably reinforced to prevent or substantially reduced stretching under load. Preferably, the belt 42 is a fiber/steel belt reinforced belt having a thickness of about 0.1 inch to about 3 inch and a width of about 2 inch to about 2.5 feet, such as the commercially available Goodyear belt material 3 ply 600 PIW or like manufactures of commercial belting. The belt 42 is not limited to any particular material or number of layers. The belt 42 can be formed to operate at any desired conveyor length.

The belt 42 can be used to accelerate the logs 14 being loaded endo from an preceding slower conveyor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A method of processing logs on a conveyor comprising:
providing a first track extending in a longitudinal direction and defining a first track surface;
providing a second track extending in the longitudinal direction and defining a second track surface that is spaced apart from said first track in a transverse direction perpendicular to the longitudinal direction;
providing a frame extending in the longitudinal direction and supporting said first and second tracks in at least a generally parallel configuration;
providing a plurality of log lugs constructed and arranged for supporting a log, each lug extending between said first and second tracks, each lug having a first support surface corresponding in shape to the first track surface and a second support surface corresponding in shape to the second track surface such that said lugs are configured to slide along said tracks in the longitudinal direction;
providing first and second opposing pulleys supported by the frame;
providing a continuous conveyor belt supported by the first and second opposing pulleys, the belt connecting the lugs in series;
providing a drive device configured to drive at least one of the first and second pulleys and rotate the continuous conveyor belt to thereby move the lugs in the longitudinal direction and to slide the lugs along said track surfaces which transports the log in the longitudinal direction during use;
providing a scanner constructed and arranged to scan the entire circumference of the log, the lugs constructed to hold the log above the belt so that the entire circumference of the log can be scanned;
providing a log cutter for cutting logs on the conveyor:
placing the log on the lugs so that the log is supported above the belt by at least two of the lugs;
transporting the log by driving at least one of the pulleys with the drive device so that the continuous conveyor belt rotates to thereby move the lugs in the longitudinal direction and to slide the lugs along said track surfaces which transports the log in the longitudinal direction;
scanning the external dimensions of the log as it is transported past the scanner; and
cutting the log with the log cutter to a desired dimension at least partially based on the scanned dimensions.

2. The method according to claim 1, wherein the step of providing lugs further comprising providing wear pads mounted on the lugs and sliding the wear pads along the associated first and second track surfaces.

3. The method according to claim 1, wherein the step of providing lugs further comprising providing replaceable wear strips disposed between said support surfaces of said lugs and said track surfaces and sliding the replaceable wear strips along the track surfaces.

4. The method according to claim 1, wherein the steps of providing first and second tracks further comprises providing a non-linear surface on at least one of said first track surface or said second track surface and sliding the support surface on the non-linear surface.

5. The method according to claim 1, wherein the steps of providing first and second tracks further comprises providing a v-shaped contour on said first track surface extending in the longitudinal direction and providing a v-shaped slot on said first support surface, the v-shaped slot corresponding in shape to said contour of said first track surface, and sliding the first support surface having the v-shaped slot along the v-shaped surface of the first track.

6. The method according to claim 1, wherein the steps of providing the lugs and the belt further comprising providing cleats on the belt and providing the lugs fastened to the cleats.

7. The method according to claim 1, wherein the steps of providing lugs and belt comprise providing at least one of the lugs integrally formed with the belt.

8. The method according to claim 1, wherein the step of providing the lugs comprises providing at least one of the lugs formed from at least one material selected from the group consisting of plastics, metals, composites, and rubbers.

9. The method according to claim 1, wherein the step of providing the lugs comprises providing at least one of the lugs formed from a plastic.

10. The method according to claim 1, further comprising driving the belt at a speed of 200 to 1000 feet per minute.

11. The method according to claim 1, further comprising driving the belt at a speed of 700 to 800 feet per minute.

12. The method according to claim 1, further comprising driving the belt at a speed higher than a preceding conveyor so that the log is accelerated when the log is loaded on the belt.

13. The method according to claim 1, wherein step of providing a scanning device further comprising providing the scanning device with metal detection capabilities and scanning the log with the scanning device to determine whether there is metal in the log.

14. The method according to claim 1, wherein the step of providing lugs further comprises providing lugs constructed to carry a log having a diameter of from 2 to 24 inches, a weight of up to 8,000 pounds, and a length up to 50 feet.

15. A method of processing logs on a conveyor comprising:
providing a first track extending in a longitudinal direction and defining a first track surface;
providing a second track extending in the longitudinal direction and defining a second track surface that is spaced apart from said first track in a transverse direction perpendicular to the longitudinal direction;
providing a frame extending in the longitudinal direction and supporting said first and second tracks in at least a generally parallel configuration;
providing a plurality of log lugs constructed and arranged for supporting a log, each lug extending between said first and second tracks, each lug having a first support surface corresponding in shape to the first track surface and a second support surface corresponding in shape to the second track surface such that said lugs are configured to slide along said tracks in the longitudinal direction;
providing first and second opposing pulleys supported by the frame;
providing a continuous conveyor belt supported by the first and second opposing pulleys, the belt connecting the lugs in series, and the belt being capable of drive speeds of 200 to 1000 feet per minute;
providing a drive device configured to drive at least one of the first and second pulleys and rotate the continuous conveyor belt to thereby move the lugs in the longitudinal direction and to slide the lugs along said track surfaces which transports the log in the longitudinal direction during use;
providing a scanner constructed and arranged to scan the entire circumference of the log, the lugs constructed to hold the log above the belt so that the entire circumference of the log can be scanned;
providing a metal detector constructed for detecting metal in the log, and the first and second tracks in a location of the metal detector comprising non-magnetic materials;
providing a log cutter for cutting logs on the conveyor:
placing the log on the lugs so that the log is supported above the belt by at least two of the lugs;
transporting the log by driving at least one of the pulleys with the drive device so that the continuous conveyor belt rotates to thereby move the lugs in the longitudinal direction and to slide the lugs along said track surfaces which transports the log in the longitudinal direction at a drive speed of 200 to 1000 feet per minute;
scanning the external dimensions of the log as it is transported past the scanner;
determining whether metal is present in the log as it is transported past the metal detector; and
cutting the log with the log cutter to a desired dimension at least partially based on the scanned dimensions.

16. The method according to claim 15, wherein the step of providing lugs further comprising providing wear pads mounted on the lugs and sliding the wear pads along the associated first and second track surfaces.

17. The method according to claim 15, wherein the step of providing lugs further comprising providing replaceable wear strips disposed between said support surfaces of said lugs and said track surfaces and sliding the replaceable wear strips along the track surfaces.

18. The method according to claim 15, wherein the steps of providing first and second tracks further comprises providing a non-linear surface on at least one of said first track surface or said second track surface and sliding the support surface on the non-linear surface.

19. The method according to claim 15, wherein the steps of providing first and second tracks further comprises providing a v-shaped contour on said first track surface extending in the longitudinal direction and providing a v-shaped slot on said first support surface, the v-shaped slot corresponding in shape to said contour of said first track surface, and sliding the first support surface having the v-shaped slot along the v-shaped surface of the first track.

20. The method according to claim 15, wherein the steps of providing the lugs and the belt further comprising providing cleats on the belt and providing the lugs fastened to the cleats.

21. The method according to claim 15, wherein the steps of providing lugs and belt comprise providing at least one of the lugs integrally formed with the belt.

22. The method according to claim 15, wherein the step of providing the lugs comprises providing at least one of the lugs formed from at least one material selected from the group consisting of plastics, metals, composites, and rubbers.

23. The method according to claim 15, wherein the step of providing the lugs comprises providing at least one of the lugs formed from a plastic.

24. The method according to claim 15, further comprising driving the belt at a speed of 700 to 800 feet per minute.

25. The method according to claim 15, further comprising driving the belt at a speed higher than a preceding conveyor so that the log is accelerated when the log is loaded on the belt.

26. The method according to claim 15, wherein the step of providing lugs further comprises providing lugs constructed to carry a log having a diameter of from 2 to 24 inches, a weight of up to 8,000 pounds, and a length up to 50 feet.

* * * * *